United States Patent Office 2,754,295
Patented July 10, 1956

2,754,295

PURIFICATION OF STREPTOMYCIN

Oliver B. Fardig, Liverpool, and Murray Arthur Kaplan, Syracuse, N. Y., assignors to Bristol Laboratories Inc., Syracuse, N. Y., a corporation of New York No Drawing. Application April 20, 1953, Serial No. 349,962

11 Claims. (Cl. 260—210)

This invention relates to a new and improved process for recovering an antibiotic, e. g. streptomycin, from nutrient media or broths in which the alkaline-reacting, nitrogen-basic antibiotic elaboration product of a microorganism has been elaborated by propagation of a microorganism, e. g. streptomycin-producing strains of *Streptomyces griseus*, and, more particularly, to a process of washing such antibiotic adsorbed on ion exchange resins to produce, upon elution, a product containing less ash.

As disclosed by Howe and Putter (U. S. Patent 2,541,420), streptomycin may be purified and concentrated by adsorption on, and subsequent elution from, carboxylic ion exchange resins. The resin is preferably in the sodium form before adsorption and as a result, upon elution, the product is contaminated with sodium or the corresponding metallic ion used in column regeneration if this is other than sodium. The sodium or other cations are co-precipitated with streptomycin, e. g. as the sulfate when elution is with sulfuric acid, upon addition of alcohol to the aqueous eluate. This co-precipitation is highly undesirable as it renders the product impure, and indeed, a very little sodium, e. g. as sulfate, will bring the potency of the precipitated product below the minimum standard of 725 micrograms/mgm. set by the Federal Food and Drug Administration. This is particularly true when, as is usual in commercial practice, the product also contains small amounts of water and of Streptomycin B.

It is an object of this invention to provide a process of obtaining from such resins an eluate containing markedly reduced amounts of impurities and particularly reduced amounts of inorganic impurities as measured by washing the solid antibiotic salt precipitated from the eluate.

The objects of this invention have been achieved and there is now discovered, according to the present invention, in the process of adsorbing an alkaline-reacting, nitrogen-basic, antibiotic elaboration product of a microorganism on and eluting it from a column of a carboxylic ion exchange resin, the step intermediate to adsorption and elution comprising washing the column of adsorbed antibiotic with an aqueous solution of an amine salt, said amine salt being formed from an amine which is capable of forming an alcohol-soluble sulfate.

It is theorized that the present invention operates in the following manner using streptomycin as an example. Streptomycin broth is passed through the column to load it, displacing sodium for example, until leakage has become so great that further loading is impractical. Considerable sodium still remains on the column, however. The wash with the amine salt serves to replace this sodium or other ion with the amine ion; sodium, calcium or other ions flow out of the column along with unused amine salt during the washing and are discarded. After subsequent elution with aqueous acid, e. g. sulfuric acid, the streptomycin sulfate and amine sulfate which are eluted together are treated with alcohol, e. g. methanol, but only the streptomycin sulfate precipitates. Without this amine salt wash, the eluate is a mixture of streptomycin sulfate and sodium sulfate which are both precipitated by the addition of alcohol.

Further understanding of the present invention is obtained by reference to the following examples, which are illustrative only and are not the exclusive embodiment of the invention.

*Example 1*

Thirty-two liters of filtered streptomycin broth of pH 7.5 was adjusted to pH 7.0 and divided into two equal portions called C and D for adsorption on carboxylic ion-exchange resin columns. The columns each contained 32 ml. of limited regeneration resin per column. The carboxylic ion-exchange resin was IRC–50, a granular copolymer of methacrylic acid and divinylbenzene containing 5% divinyl benzene described in U. S. Patent 2,541,420 and other patents referred to therein. By "limited regeneration" resin it is meant that 1.25 equivalents of aqueous sodium hydroxide were passed down the column for each ml. of original IRC–50 resin in the hydrogen form; during this conversion swelling occurred, so that about 25 ml. of IRC–50 in the hydrogen cycle became about 31.7 ml. of sodium IRC–50. The column was then back-washed with water until the effluent liquid was about pH 7.0 to 7.5 and was then ready for use.

The broths C and D were then passed down the columns (called C and D respectively) at a rate of about seven mls. per minute per 32 ml. of resin. The pH of the effluent liquid from both columns was in the range 6.1 to 7.2 at all times. The adsorption required seven days; no shrinkage of the resins was observed.

Chemical assay of roughly every liter of the effluent broth gave the following results:

| Total Volume of Effluent in mls. | Assay, Columns | |
| --- | --- | --- |
|  | C | D |
| 1,500 | 94.5 | 101.0 |
| 2,500 | 54 | 81 |
| 3,500 | 121 | 121 |
| 4,500 | 135 | 162 |
| 5,500 | 182 | 175 |
| 6,500 | 245 | 250 |
| 7,500 | 270 | 297 |
| 8,500 | 310 | 338 |
| 9,500 | 350 | 324 |
| 10,500 | 350 | 405 |
| 11,000 | 310 | 378 |
| 12,000 | 378 | 405 |
| 13,000 | 445 | 390 |
| 15,000 | 500 |  |
| 16,000 |  | 568 |

Chemical assay of the starting broth was about 565 maltol units/cc.

The columns were backwashed with water. Column C was then washed at 10 mls./min. with 500 mls. of a one percent solution of citric acid which had been brought to pH 6.0 by the addition of triethylamine. The effluent pH was in the range 6.75–7.05. Column C was then back-washed with water for a few minutes.

The streptomycin was then eluted by passage through the columns of 150 mls. 1N H₂SO₄ per column at a rate of 1 ml./min./column. Cuts were taken when the pH changed sharply, thus:

| Effluent in ml. | pH, Column | | Effluent in ml. |
|---|---|---|---|
| | C | D | |
| 10 } Cut I | 7.80 | | 10 } Cut I |
| 20 | 7.80 | | 20 |
| 30 | 6.06 | 6.0 | 30 |
| 40 | 4.45 | | 40 } Cut II |
| 50 } Cut II | 3.25 | | 50 |
| 60 | 3.80 | 3.65 | 60 |
| 70 | | 2.60 | 70 |
| 80 | 1.85 | | 80 |
| 90 | .95 | | 90 } Cut III |
| 100 } Cut III | .48 | 2.50 | 100 |
| 110 | .45 | | 110 |
| 150 | .45 | | 150 |
| | .45 | | |

These eluate cuts were neutralized where necessary by passage through an anion exchange resin (IR-4B), lyophilized, weighed, assayed and the ash determined with the following results.

| | Column C Cut Number | | | Column D Cut Number | | |
|---|---|---|---|---|---|---|
| | I | II | III | I | II | III |
| Wt., mgms | 210 | 5,000 | 2,300 | 230 | 2,700 | 4,610 |
| Ash, percent | 0.48 | 1.65 | 4.1 | 42.5 | 20.8 | 9.7 |
| Ash, mgm | 1.01 | 82.5 | 92 | 97.8 | 562 | 453 |
| Activity u./mgm. by chemical method | 375 | 568 | 590 | 348 | 550 | 636 |
| Units Activity in thousands | 79 | 2,840 | 1,360 | 80 | 1,485 | 2,930 |
| Total Units: | | | | | | |
| Activity in thousands | | 4,279 | | | 4,495 | |
| Total ash, mgms | | 176 | | | 1,113 | |
| Percent Recovery of Activity | | 46.1 | | | 48.4 | |
| Average percent Ash per mgm, solid | | 2.33 | | | 15 | |

It is apparent that the triethylamine citrate wash is very effective in reducing the ash content of the final solids without significantly altering either the amount recovered or its potency. The percentage recovery was nearly quantitative with respect to that streptomycin which was actually absorbed; slightly less than 50% of the total activity passed through the columns was adsorbed; there is thus virtually no loss by elution of streptomycin by the triethylamine citrate wash.

*Example II*

Citric acid is neutralized with triethanolamine, diethanolamine, diethylamine and monoethanolamine respectively in place of the triethylamine of Example I. Similar use in washing the resin with these four citrates also is very effective in reducing the ash content of the final solids without significantly altering either the amount recovered or its potency.

*Example III*

A large batch of aqueous triethylamine citrate is prepared by mixing 250 pounds technical citric acid into 25,000 pounds water and bringing the pH of this solution to about 6.0–6.4 by the addition of about 54 gallons technical triethylamine.

*Example IV*

Seven lots of comparably processed streptomycin broth were adsorbed on and eluted from IRC–50, with or without a triethylamine citrate wash, eluted by an acid wash and the eluate analyzed for ash with the following results:

| Run Number | Triethylamine Citrate Wash Used | Ash as Percentage of Solids in Eluate |
|---|---|---|
| 1 | Yes | 2.14 |
| 2 | Yes | 3.02 |
| 3 | Yes | 1.39 |
| 4 | Yes | 6.87 |
| 5 | No | 21.1 |
| 6 | No | 35.4 |
| 7 | No | 18.0 |

*Example V*

Aqueous solutions of triethylamine sulfate, diethylamine hydrochloride, triethanolamine phosphate diethanolamine sulfate, monoethanolamine sulfate, dimethylaniline ethylenediaminetetraacetate, quinoline succinate, pyridine adipate, aniline glutarate and collidine acetate, respectively, are used in place of aqueous triethylamine citrate in the procedure of Example I to provide, after elution and precipitation, streptomycin sulfate containing less ash than is found when such washing step is omitted.

In addition to the streptomycin of the examples, other alkaline-reacting, nitrogen-basic antibiotic substances or mixtures thereof can be employed in the practice of this invention, for instance, streptothricin, neomycin, hydroxystreptomycin, viomycin, netropsin and the like.

The amine salts used in the present invention must be derived from amines which meet two criteria: (a) the amine must dissolve in dilute aqueous acid, e. g. sulfuric acid, citric acid, and (b) the amine must form with the acid used to elute the column an "alcohol-soluble" salt. This would usually mean the sulfate but could mean the hydrochloride or the phosphate. The amine, in the form of its ammonium ion, must roughly equal or exceed sodium ion in affinity for carboxylic ion exchange resins.

The alcoholic solvent in which the amine sulfate must be soluble is defined as any water-miscible alcohol, including ethyleneglycol monoethyl ether, and mixtures of these with small amounts (e. g. 10–20%) of water, acetone and the like. The preferred solvents are lower aliphatic monohydric alcohols of one to four carbon atoms and particularly methanol. To determine whether an amine sulfate is soluble or insoluble in such a solvent, e. g. methanol or methanol containing about ten percent water, one need only apply the simple test known to every student of chemistry or consult the literature. For the sake of brevity, such amine sulfates are referred to herein as "alcohol-soluble."

As is readily apparent, the amine salts used in the present invention must be soluble in water to the extent of at least one percent.

Among the amines whose salts can be employed are triethylamine, diethylamine, ethylamine, dimethylaniline, quinoline, pyridine, ethanolamine, diethanolamine, triethanolamine, aniline, collidine, morpholine, piperidine, alpha-picoline, cyclohexylamine, dibutylamine, dicyclohexylamine, diethylaniline, diethylethanolamine, dimethylethanolamine, isopropylamine, di-isopropylamine, dimethylamine, trimethylamine, hexamethylenetetramine, melamine, o-toluidine, p-toluidine, xylidines and the like. However, any amine which meets the two criteria discussed above may be used. Triethylamine and monoethanolamine are preferred.

The amine salt used to wash the columns in the present invention may be any water-soluble salt in the group of amines defined above with organic or inorganic acids. Among these acids are sulphuric, hydrochloric, phosphoric, citric, succinic, adipic, glutaric, maleic, fumaric, ethylene-diamine-tetraacetic, boric, lactic, lauric, monochloroacetic, propionic and the like. Citric acid is preferred because it also removes by chelation calcium ions adsorbed on the column. To determine whether an amine salt is water-soluble, one again need only apply the usual, simple laboratory test.

We claim:

1. In the process of adsorbing an alkaline-reacting, nitrogen-basic, antibiotic elaboration product of a microorganism on and eluting it from a column of a carboxylic ion exchange resin, the step intermediate to adsorption and elution comprising washing the column of adsorbed antibiotic with an aqueous solution of an amine salt, said amine salt being formed from an amine which is capable of forming an alcohol-soluble sulfate.

2. In the process of adsorbing streptomycin on and eluting it from a column of a carboxylic ion exchange resin, the step intermediate to adsorption and elution comprising washing the column of adsorbed antibiotic with an aqueous solution of an amine salt, said amine salt being formed from an amine which is capable of forming an alcohol-soluble sulfate.

3. In the process of adsorbing streptomycin on and eluting streptomycin from a column of a carboxylic ion exchange resin, the step intermediate to adsorption and elution comprising washing the column of adsorbed streptomycin with an aqueous solution of a member selected from the group consisting of the salts of lower alkylamines and lower alkanolamines.

4. In the process of adsorbing streptomycin on and eluting streptomycin from a column of a carboxylic ion exchange resin, the step intermediate to adsorption and elution comprising washing the column of adsorbed streptomycin with an aqueous solution of a member selected from the group consisting of the citrates of lower alkylamines and lower alkanolamines.

5. In the process of adsorbing streptomycin on and eluting streptomycin from a column of a carboxylic ion exchange resin, the step intermediate to adsorption and elution comprising washing the column of adsorbed streptomycin with an aqueous solution of triethylaminecitrate.

6. In the process of adsorbing streptomycin on and eluting streptomycin from a column of a carboxylic ion exchange resin, the step intermediate to adsorption and elution comprising washing the column of adsorbed streptomycin with an aqueous solution of monoethanolamine citrate.

7. In the process of adsorbing streptomycin on and eluting streptomycin from a column of a carboxylic ion exchange resin, the step intermediate to adsorption and elution comprising washing the column of adsorbed streptomycin with an aqueous solution of diethanolamine citrate.

8. In the process of adsorbing streptomycin on and eluting streptomycin from a column of a carboxylic ion exchange resin, the step intermediate to adsorption and elution comprising washing the column of adsorbed streptomycin with an aqueous solution of triethanolamine citrate.

9. In the process of adsorbing streptomycin on and eluting streptomycin from a column of a carboxylic ion exchange resin, the step intermediate to adsorption and elution comprising washing the column of adsorbed streptomycin with an aqueous solution of diethylamine citrate.

10. In the process of adsorbing streptomycin on and eluting streptomycin from a column of a carboxylic ion exchange resin, the step intermediate to adsorption and elution comprising washing the column of adsorbed streptomycin with an aqueous solution of a lower alkylamine citrate.

11. In the process of adsorbing streptomycin on and eluting streptomycin from a column of a carboxylic ion exchange resin, the step intermediate to adsorption and elution comprising washing the column of adsorbed streptomycin with an aqueous solution of a lower alkanolamine citrate.

References Cited in the file of this patent

UNITED STATES PATENTS

| | | |
|---|---|---|
| 2,528,022 | Van Dolah et al. | Oct. 31, 1950 |
| 2,541,420 | Howe et al. | Feb. 13, 1951 |
| 2,560,891 | Regna et al. | July 17, 1951 |
| 2,653,151 | Sokol et al. | Sept. 22, 1953 |

OTHER REFERENCES

Kocholaty, Archives of Biochemistry, 15:1, pages 55–64, October 1947.